United States Patent
Cho

(10) Patent No.: US 10,077,813 B2
(45) Date of Patent: Sep. 18, 2018

(54) SHIFT CONTROL METHOD FOR DCT VEHICLE

(71) Applicant: Hyundai Motor Company, Seoul (KR)

(72) Inventor: Sung Hyun Cho, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 225 days.

(21) Appl. No.: 15/196,812

(22) Filed: Jun. 29, 2016

(65) Prior Publication Data

US 2017/0234375 A1    Aug. 17, 2017

(30) Foreign Application Priority Data

Feb. 15, 2016 (KR) .......................... 10-2016-0017031

(51) Int. Cl.
*F16D 28/00* (2006.01)
*F16D 21/00* (2006.01)
(Continued)

(52) U.S. Cl.
CPC ............. *F16D 28/00* (2013.01); *F16D 21/00* (2013.01); *F16D 23/02* (2013.01); *F16D 48/06* (2013.01); *F16H 1/00* (2013.01); *F16D 2500/10412* (2013.01); *F16D 2500/3144* (2013.01); *F16D 2500/50653* (2013.01)

(58) Field of Classification Search
CPC .......... F16D 28/00; F16D 48/06; F16D 23/02; F16D 2500/50653; F16D 2500/10412; F16D 2500/3144
See application file for complete search history.

(56) References Cited

U.S. PATENT DOCUMENTS

| | | | | |
|---|---|---|---|---|
| 9,242,651 B1* | 1/2016 | Nowak | ................. | B60W 30/19 |
| 2015/0024905 A1* | 1/2015 | Dunfee, II | .......... | B60W 10/113 |
| | | | | 477/77 |
| 2017/0138418 A1* | 5/2017 | Cho | ........................ | F16H 63/46 |

FOREIGN PATENT DOCUMENTS

| | | |
|---|---|---|
| JP | H09-295526 A | 11/1997 |
| JP | 2007-162844 A | 6/2007 |

(Continued)

OTHER PUBLICATIONS

Korean Office Action dated Jun. 20, 2017 form the corresponding Korean Application No. 10-2016-0017031, 4 pp.
(Continued)

*Primary Examiner* — David J Hlavka
(74) *Attorney, Agent, or Firm* — Brinks Gilson & Lione

(57) ABSTRACT

A shift control method for a DCT vehicle, which adjusts a time required to shift gears through clutch control in a DCT. The shift control method includes controlling a release-side clutch such that the release-side clutch is partially disengaged by a controller when gear shifting is initiated in a state in which an accelerator pedal is not pressed, performing synchronization control by partially applying an apply-side clutch torque in an initial stage of synchronization such that an engine rotational speed follows and synchronizes an apply-side input shaft speed, and partially applying a release-side clutch torque in a last stage of synchronization by the controller, and performing torque hand-over control such that an apply-side clutch is engaged while the release-side clutch is disengaged by the controller, after performing the synchronization control.

8 Claims, 3 Drawing Sheets

(51) Int. Cl.
*F16D 23/02* (2006.01)
*F16H 1/00* (2006.01)
*F16D 48/06* (2006.01)

(56) References Cited

FOREIGN PATENT DOCUMENTS

| | | |
|---|---|---|
| JP | 2007-170441 A | 7/2007 |
| JP | 2008-106821 A | 5/2008 |
| JP | 2011-190893 | 9/2011 |
| JP | 2013-079674 A | 5/2013 |
| KR | 10-2013-0003687 | 1/2013 |
| KR | 10-2014-0034548 | 3/2014 |
| KR | 10-1371745 | 3/2014 |
| KR | 10-2015-0024212 A | 3/2015 |

OTHER PUBLICATIONS

Korean Office Action dated Oct. 19, 2017 from the corresponding Korean Application No. 10-2016-0017031, 2 pp.

\* cited by examiner

SHIFT CONTROL METHOD FOR DCT VEHICLE

CROSS REFERENCE TO RELATED APPLICATION

The present application claims priority to and the benefit of Korean Patent Application No. 10-2016-0017031 filed on Feb. 15, 2016, which is incorporated herein by reference in its entirety.

FIELD

The present disclosure relates to a shift control method for a DCT vehicle, which is capable of adjusting a time required to shift gears through clutch control in a DCT.

BACKGROUND

The statements in this section merely provide background information related to the present disclosure and may not constitute prior art.

A DCT (Dual Clutch Transmission) includes two input shafts which are respectively connected to two clutches, and shift gears installed to these two input shafts are bisected so as to be disposed at odd and even sides. Thus, the two input shafts are functionally divided such that one is used to shift the odd gears and the other is used to shift the even gears.

Accordingly, when any shift stage is sequentially changed to a next shift stage in the DCT having the above configuration, the change of speed may be executed by disengaging the clutch connected to one input shaft to which the current shift stage is applied while engaging the clutch connected to the other input shaft to which the next shift stage is applied. Consequently, the DCT may allow the gears to be shifted while preventing torque transferred to driving wheels from being perfectly or entirely disconnected during the gear shifting.

Meanwhile, when an engine rotational speed is controlled in an inertia phase during a power-off upshift in a vehicle equipped with a DCT, the engine rotational speed is reduced using only the drag torque and inertia of an engine.

However, since the change of speed in the conventional DCT depends on the drag torque and inertia of the engine in a hardware manner, we have discovered that there is a problem in that a time required to shift gears, particularly a time for shifting gears in the inertia phase, is long.

The foregoing is intended merely to aid in the understanding of the background of the present disclosure, and is not intended to mean that the foregoing or the present disclosure falls within the purview of the related art that is already known to those skilled in the art. Further areas of applicability will become apparent from the description provided herein. It should be understood that the description and specific examples are intended for purposes of illustration only and are not intended to limit the scope of the present disclosure.

SUMMARY

Accordingly, the present disclosure proposes a shift control method for a DCT vehicle, which is capable of adjusting a time required to shift gears through clutch control in a DCT.

In accordance with an aspect of the present disclosure, a shift control method for a DCT vehicle includes controlling a release-side clutch such that the release-side clutch is partially disengaged by a controller when gear shifting is initiated in a state in which an accelerator pedal is not pressed, performing synchronization control by partially applying an apply-side clutch torque in the initial stage of synchronization such that an engine rotational speed follows and synchronizes an apply-side input shaft speed, and partially applying a release-side clutch torque in the last stage of synchronization by the controller, after the controlling a release-side clutch such that the release-side clutch is partially disengaged, and performing torque hand-over control such that an apply-side clutch is engaged while the release-side clutch is disengaged by the controller, after the performing synchronization control.

In the controlling a release-side clutch such that the release-side clutch is partially disengaged, it may be determined whether or not a power-off upshift, in which the gears are shifted in the state in which the accelerator pedal is not pressed, is initiated, and an apply-side gear may be engaged during the power-off upshift.

The performing synchronization control may include performing first synchronization control such that the engine rotational speed follows the apply-side input shaft speed by partially increasing the apply-side clutch torque, after the controlling a release-side clutch such that the release-side clutch is partially disengaged, and performing second synchronization control such that, when a slip ratio of the engine rotational speed to the apply-side input shaft speed and a release-side input shaft speed is equal to or higher than a target slip ratio in the performing first synchronization control, the release-side clutch torque is partially increased while the apply-side clutch torque is partially released.

In the performing first synchronization control, a target engine angular acceleration may be set, and the apply-side clutch torque may be controlled to be increased until a current engine angular acceleration follows the target engine angular acceleration.

In the performing second synchronization control, the release-side clutch torque may be controlled so as to be smaller than an absolute value of engine drag torque, or so as to be increased to a level corresponding to the absolute value of engine drag torque.

When an amount of slip of the apply-side clutch is less than a reference value in the performing second synchronization control, the method may enter the performing torque hand-over control.

The apply-side and release-side clutches may be operated so as to be engaged and disengaged by clutch actuators, and the clutch actuators may be controlled so as to be operated by the controller.

As apparent from the above summary, after the shift process enters the inertia phase, the time required to shift gears is adjusted using the apply-side clutch, and the synchronous speed is adjusted using the release-side clutch according to the progress state of the synchronization. Accordingly, it is possible to control the gear shifting for a desired shift time, and to improve the merchantable quality of the vehicle by reducing the time required to shift gears and the impact due to gear shifting.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
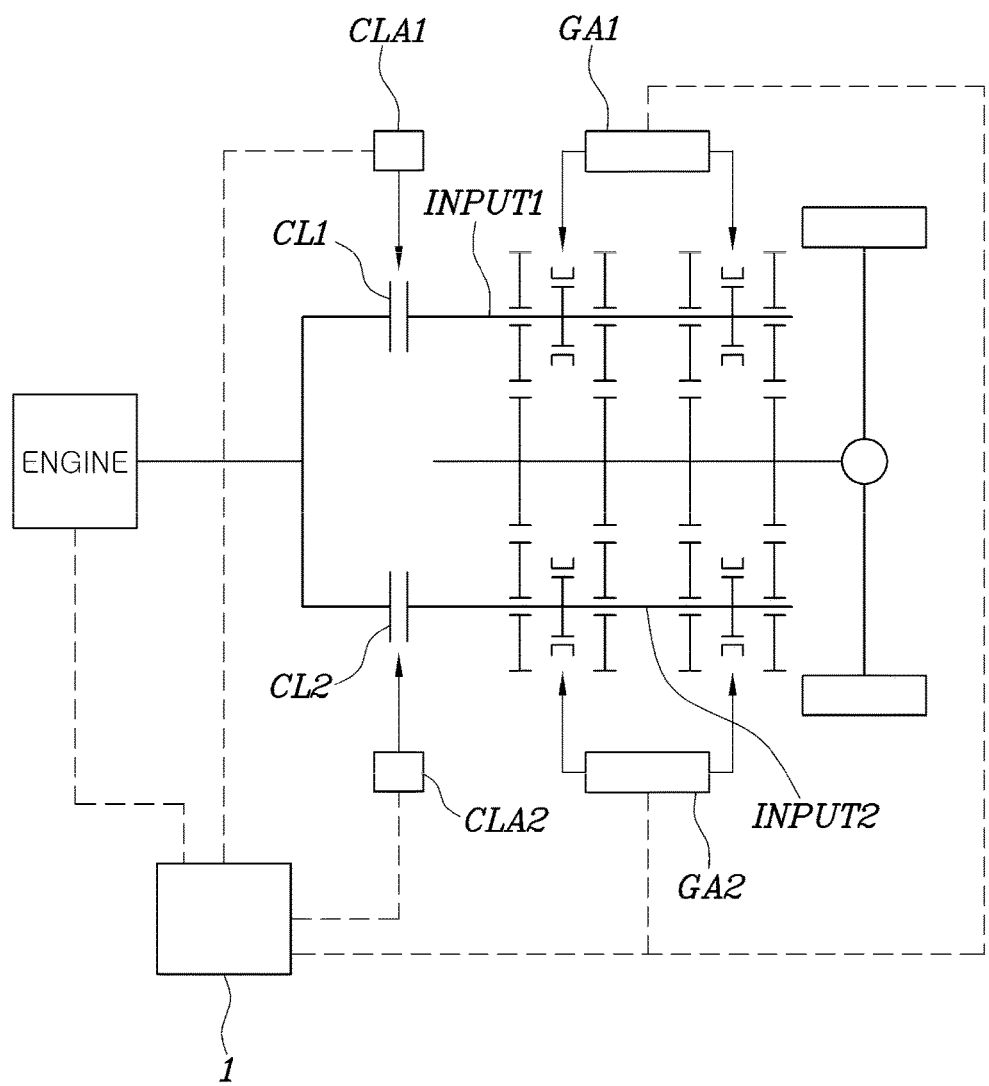
FIG. 1 is a diagram illustrating an overall configuration of a DCT vehicle to which the present disclosure may be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Embodiments of the present disclosure will be described below with reference to the accompanying drawings.

A shift control method for a DCT vehicle according to an embodiment of the present disclosure may include a release step, a synchronization step, and a torque hand-over step.

Figure 2:
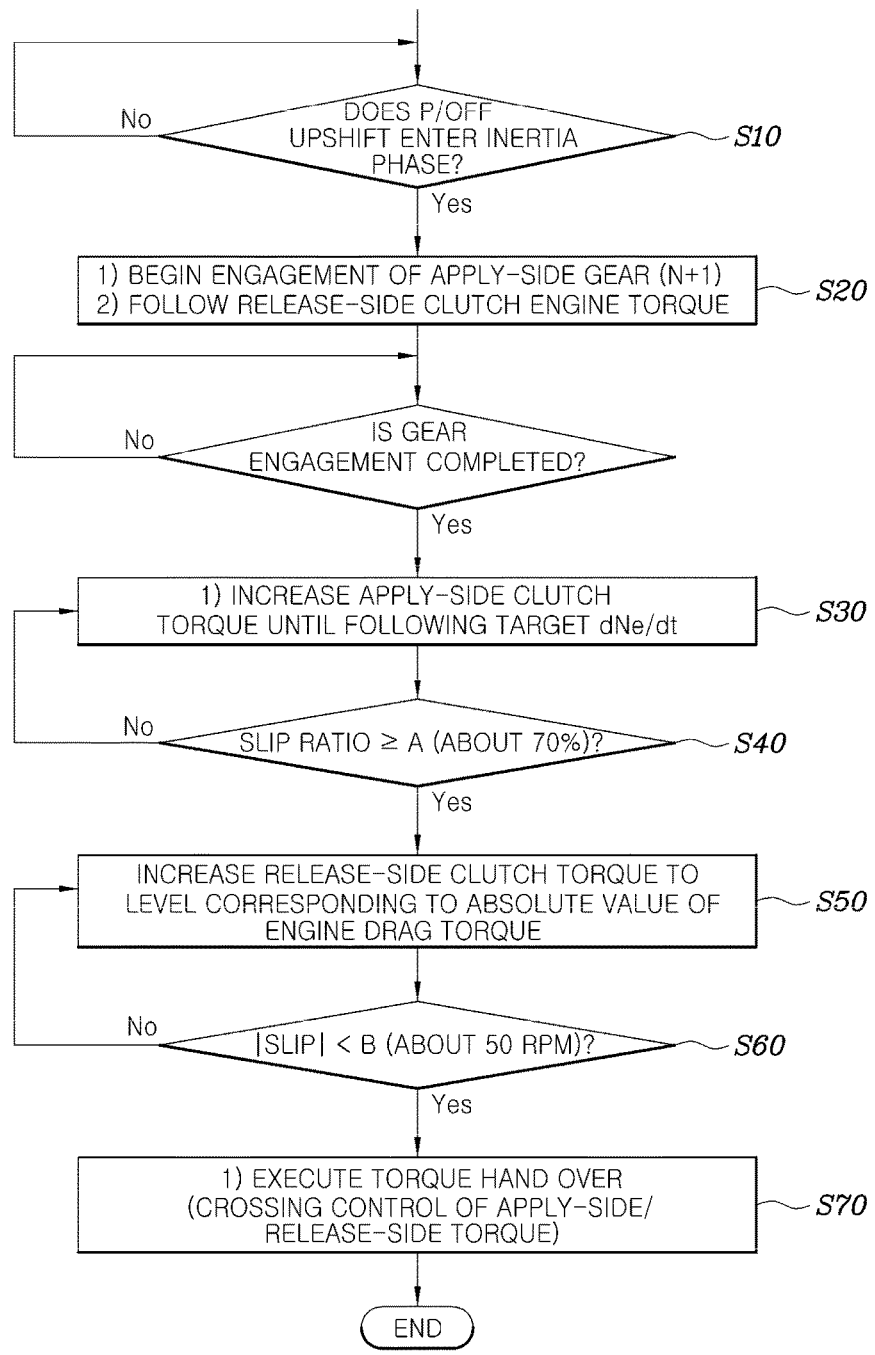
FIG. 2 is a flowchart illustrating a shift control method for a DCT vehicle according to an embodiment of the present disclosure.
Figure 3:
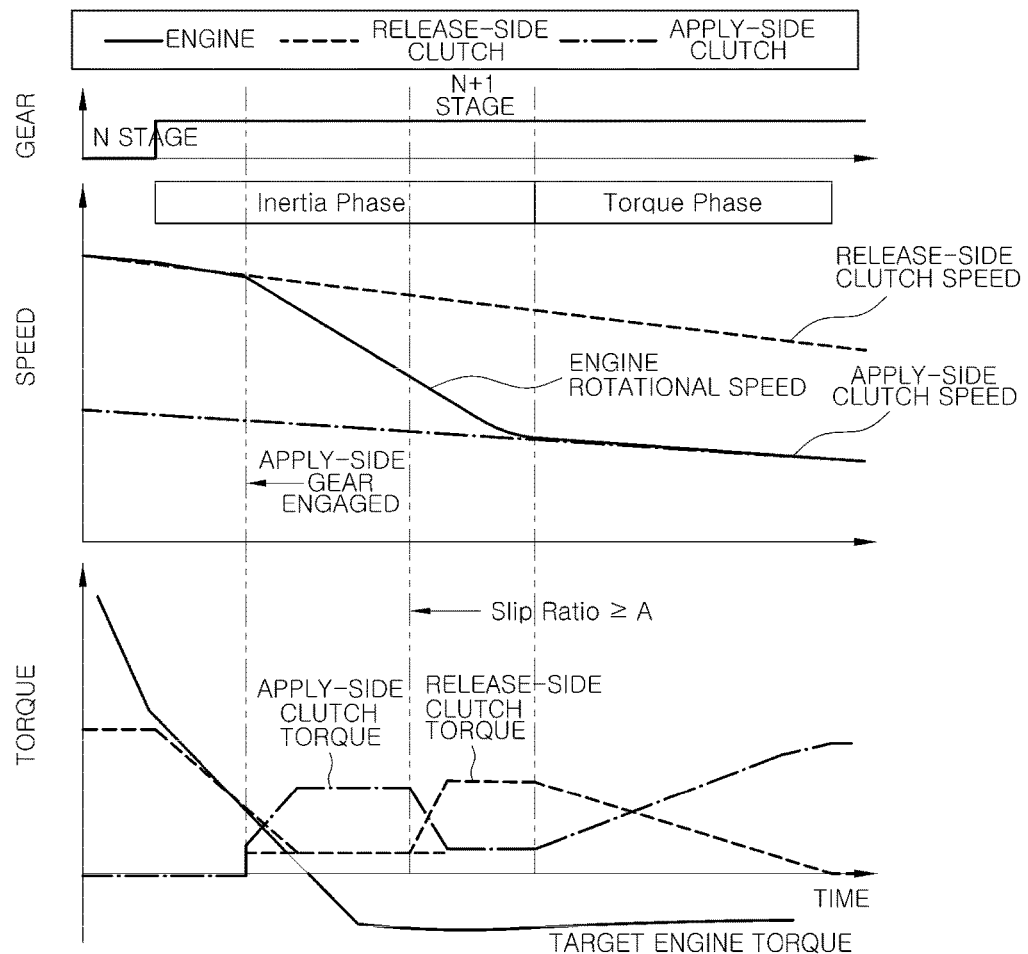
FIG. 3 is a chart illustrating a change in speed and torque of an engine and a clutch in the shift control method according to the embodiment of the present disclosure.

The shift control method according to one embodiment of the present disclosure will be described in detail with reference to FIGS. 2 and 3. First, when gear shifting is initiated in the state in which an accelerator pedal is not pressed, a release-side clutch may be controlled by a controller 1 to be partially disengaged in the release step.

For example, in the release step, it may be determined whether or not a power-off upshift, in which a current shift stage is changed to a higher shift stage in the state in which the accelerator pedal is not pressed by a driver, is initiated.

When the power-off upshift is initiated, the release-side clutch may be controlled to be disengaged such that the torque of the release-side clutch follows an engine torque that is reduced while it enters an inertia phase in an initial stage of the gear shifting, and an apply-side gear in a target shift stage may be engaged. In this case, the release-side clutch and the apply-side clutch may be operated by respective clutch actuators CLA1 and CLA2, and the clutch actuators may be controlled to be operated by the controller 1. In addition, the gears in the shift stage may be fastened by a synchronizer, and the synchronizer may be fastened to and operated by gear actuators GA1 and GA2.

Here, in FIG. 1, an apply-side clutch and a release-side clutch from among two clutches included in a DCT, are respectively designated by reference numerals CL1 and CL2, an apply-side clutch actuator and a release-side clutch actuator for operating the clutches are respectively designated by reference numerals CLA1 and CLA2, and an apply-side input shaft and a release-side input shaft are respectively designated by reference numerals INPUT1 and INPUT2. However, they are exemplary for the sake of understanding the present disclosure. For example, apply-side and release-side components may be changed to each other, i.e. switched or swapped, according to a clutch used in a current shift stage and in a target shift stage.

In addition, in the synchronization step, the controller 1 may control apply-side and release-side clutch torques such that the apply-side is partially applied in the initial stage of synchronization and the release-side clutch torque is partially applied in a last stage of synchronization, in order for an engine rotational speed to follow and synchronize an apply-side input shaft speed, after the release step.

Here, the synchronization step may include a first synchronization step and a second synchronization step.

Specifically, in the first synchronization step, the engine rotational speed synchronized with a release-side input shaft speed may be controlled to follow the apply-side input shaft speed by controlling the apply-side clutch torque such that the apply-side clutch torque is partially increased, after the release step.

In this case, in order to partially increase the apply-side clutch torque, a target engine angular acceleration is set, and the apply-side clutch torque may be controlled to be increased until a current engine angular acceleration follows the target engine angular acceleration.

The following equation is an equation for calculating the engine angular acceleration, and the engine angular acceleration is gradually decreased as the apply-side clutch torque is increased. Therefore, the engine rotational speed may be controlled to follow the apply-side input shaft speed by increasing the apply-side clutch torque until the calculated engine angular acceleration reaches the target engine angular acceleration.

Engine angular acceleration $(dNe/dt)=(Te+Tc\_app-Tc\_rel)/Je$, where Te: engine torque, Tc_app: apply-side clutch torque, Tc_rel: release-side clutch torque, and Je: engine rotational inertia.

That is, when the synchronization begins, the apply-side clutch torque is controlled to be increased, and thus the engine rotational speed rapidly follows the apply-side input shaft speed. Consequently, it is possible to reduce a total time for shifting gears by reducing the time required for the synchronization.

In the second synchronization step, when the slip ratio of the engine rotational speed to the apply-side and release-side input shaft speeds is equal to or higher than a target slip ratio in the first synchronization step, the apply-side and release-side clutch torques may be controlled such that the apply-side clutch torque is partially released while the release-side clutch torque is partially increased.

For example, the slip ratio may be expressed by the following equation, and the slip ratio is high when the difference between the apply-side input shaft speed and the engine rotational speed is decreased while the difference between the release-side input shaft speed and the engine rotational speed is increased.

Slip ratio=$(V\_rel-V\_eng)/(V\_rel-V\_app)$, where V_eng: engine rotational speed, V_app: apply-side input shaft speed, and V_rel: release-side input shaft speed.

That is, in the last stage of the section in which the engine rotational speed synchronizes the apply-side input shaft speed, the release-side clutch torque is controlled to be increased while the apply-side clutch torque is controlled to be decreased, thereby preventing the engine rotational speed from rapidly synchronizing the apply-side input shaft speed. Therefore, it is possible to prevent an impact due to gear shifting from occurring and to improve a shift quality.

In this case, in the second synchronization step, the release-side clutch torque may be controlled to be smaller than the absolute value of engine drag torque, or so as to be increased to a level corresponding to the absolute value of engine drag torque.

That is, Te−(Tc_app−Tc_rel)=Je*dNe/dt may be obtained using the above-mentioned equation of engine angular acceleration.

However, since the current gear-shifting is performed in a power-off state (the state in which the accelerator pedal is not pressed), the engine torque (Te) is a (−) torque due to the engine drag torque.

Accordingly, when the apply-side clutch torque (Tc_app) is increased, a force is applied such that the engine angular acceleration is decreased. When the release-side clutch torque (Tc_rel) is increased, a force is applied such that the engine angular acceleration is increased.

Thus, the release-side clutch torque (Tc_rel) is controlled to be increased, but the engine rotational speed should not be increased due to the increase of the release-side clutch torque. Therefore, the engine rotational speed is preferably controlled to match the apply-side input shaft speed by increasing the release-side clutch torque so as to corresponding to Te (the absolute value of engine drag torque).

In addition, in the torque hand-over step, the apply-side clutch may be controlled to be engaged while the release-side clutch is controlled to be disengaged by the controller 1, after the synchronization step.

For example, when the amount of slip of the apply-side clutch is less than a reference value in the synchronization step, the shift process enters a torque phase section from an inertia phase section so that the torque hand-over step may be performed, and the current shift stage is changed to a target high shift stage.

The shift control flow for a DCT vehicle according to the embodiment of the present disclosure will be described with reference to FIGS. 2 and 3.

It is determined whether the power-off upshift is performed based on the traveling state of the vehicle (S10).

When the current vehicle is determined to enter the power-off upshift, the release-side clutch torque is controlled to be released so as to follow the engine torque while the apply-side gear is engaged (S20).

Next, the target engine angular acceleration is set, and the engine rotational speed is controlled so as to follow and synchronize the apply-side input shaft speed by increasing the apply-side clutch torque such that the apply-side clutch torque follows the target engine angular acceleration (S30).

In the synchronization process (S30), it is determined whether the slip ratio reaches a degree of about 70% (S40), or other predetermined percentage. When the slip ratio is not determined to reach the degree of 70%, the apply-side clutch torque is continuously controlled such that the current engine angular acceleration follows the target engine angular acceleration.

On the other hand, when the slip ratio is determined to reach the degree of 70%, the apply-side clutch torque is controlled to be decreased while the release-side clutch torque is controlled to be increased to a level corresponding to the absolute value of engine drag torque (S50).

Next, it is determined whether the amount of slip of the apply-side clutch is less than about 50 RPM (S60) or other predetermined amount. When the amount of slip of the apply-side clutch is determined to be less than about 50 RPM, the crossing control of the apply-side and release-side clutch torques is executed (S70), so that the corresponding upshift may be performed.

As apparent from the above description, after the shift process enters the inertia phase, the time required to shift gears is adjusted using the apply-side clutch, and the synchronous speed is adjusted using the release-side clutch according to the progress state of the synchronization. Accordingly, it is possible to control the gear shifting for a desired shift time in the inertia phase section through the proper control between the apply-side clutch and the release-side clutch. In addition, it is possible to improve the merchantable quality of the vehicle by reducing the impact due to gear shifting while reducing the time required to shift gears compared to existing methods.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A shift control method for a DCT vehicle having a release-side clutch and an apply-side clutch controlled by a controller, the method comprising:
   controlling the release-side clutch such that the release-side clutch is partially disengaged when gear shifting is initiated in a state in which an accelerator pedal is not pressed;
   performing synchronization control by partially applying the apply-side clutch torque in an initial stage of synchronization such that an engine rotational speed follows and synchronizes an apply-side input shaft speed, and partially applying a release-side clutch torque in a last stage of synchronization, after the controlling the release-side clutch such that the release-side clutch is partially disengaged; and
   performing torque hand-over control such that the apply-side clutch is engaged while the release-side clutch is disengaged, after the performing synchronization control.

2. The shift control method according to claim 1, wherein, in the controlling the release-side clutch, the controller determines whether or not a power-off upshift, in which the gear shifting is performed in the state in which the accelerator pedal is not pressed, is initiated, and an apply-side gear is engaged when the power-off upshift is initiated.

3. The shift control method according to claim 2, wherein the performing synchronization control comprises:
   performing a first synchronization control such that the engine rotational speed follows the apply-side input shaft speed by partially increasing the apply-side clutch torque, after the controlling the release-side clutch such that the release-side clutch is partially disengaged; and
   performing a second synchronization control such that, when a slip ratio of the engine rotational speed to the apply-side input shaft speed and a release-side input shaft speed is equal to or higher than a target slip ratio in the performing first synchronization control, the release-side clutch torque is partially increased while the apply-side clutch torque is partially released.

4. The shift control method according to claim 3, wherein, in the performing the first synchronization control, a target engine angular acceleration is set, and the apply-side clutch torque is controlled to be increased until a current engine angular acceleration follows the target engine angular acceleration.

5. The shift control method according to claim 3, wherein, in the performing the second synchronization control, the release-side clutch torque is controlled so as to be smaller than an absolute value of engine drag torque.

6. The shift control method according to claim 3, wherein, in the performing the second synchronization control, the release-side clutch torque is controlled so as to be increased to a level corresponding to the absolute value of engine drag torque.

7. The shift control method according to claim 3, wherein, when an amount of slip of the apply-side clutch is less than a reference value in performing the second synchronization control, the method enters the performing torque hand-over control.

8. The shift control method according to claim 1, wherein:
   the apply-side and release-side clutches are operated so as to be engaged and disengaged by clutch actuators; and
   the clutch actuators are controlled so as to be operated by the controller.

\* \* \* \* \*